United States Patent

Sumida et al.

[11] Patent Number: 5,558,387
[45] Date of Patent: Sep. 24, 1996

[54] FIXING STRUCTURE FOR A WINDOW GLASS

[75] Inventors: Atsushi Sumida, Nagoya; Yoshihiko Kanamori, Toyota, both of Japan

[73] Assignee: Toyoda Gosei Co., Ltd., Japan

[21] Appl. No.: 452,176

[22] Filed: May 26, 1995

[51] Int. Cl.[6] .................................................. B60J 10/02
[52] U.S. Cl. ........................ 296/93; 296/96.21; 52/208
[58] Field of Search ............................... 296/93, 146.15, 296/96.21; 156/108; 52/208

[56] References Cited

U.S. PATENT DOCUMENTS

| 4,389,069 | 6/1983 | Sengoka ................................. 296/93 X |
| 4,434,593 | 3/1984 | Horike et al. ..................... 296/96.21 X |
| 4,551,372 | 11/1985 | Kunert . |
| 4,939,879 | 7/1990 | Gold ......................................... 52/208 |
| 5,297,843 | 3/1994 | Yada et al. ............................ 296/93 X |
| 5,443,299 | 8/1995 | Yada et al. ................................. 296/93 |

FOREIGN PATENT DOCUMENTS

| 0545896A1 | 6/1993 | European Pat. Off. . |
| 0576179A1 | 12/1993 | European Pat. Off. . |
| 1095212 | 12/1967 | United Kingdom . |
| 2174746 | 11/1986 | United Kingdom . |

*Primary Examiner*—Joseph D. Pape
*Attorney, Agent, or Firm*—Cushman Darby & Cushman, L.L.P.

[57] ABSTRACT

In a structure for fixing a window glass to a window opening edge of a vehicle body, providing: an adhesive for bonding an outer periphery of the window glass to a glass receiving surface in the window opening edge of the vehicle body; and a dam mounted on an inner surface of the window glass along the adhesive for preventing the adhesive from projecting inwardly, in which the dam includes: a first recess formed at a first middle part of a side surface of the dam, to make the first middle part thinner than an upper surface of the dam; a second recess formed at a second middle part of a bottom surface of the dam where the dam contacts the glass receiving surface; and a pair of legs formed on both sides of the second recess, the dam can be smoothly bent along the corner of the window glass, with a less inclination thereof and a little deformation of the cross sectional configuration thereof.

1 Claim, 2 Drawing Sheets

FIXING STRUCTURE FOR A WINDOW GLASS

BACKGROUND OF THE INVENTION

The present invention relates to a window glass of the adhesion type, and more particularly to the structure of a dam.

A conventional fixing structure, which is used for a window glass 1 on the front window or the rear window of an automobile as shown in FIG. 1, is of an adhesion type as shown in FIG. 4. In this fixing structure, the peripheral part of the window glass 1 is bonded by adhesive 6 to a flange-like glass receiving surface 21 of a window opening edge 2 of a vehicle body. In the window glass 1 of the adhesion type, a dam 3 made of rubber or synthetic resin is coupled along the adhesive 6, to prevent the adhesive 6 from projecting inwardly. In the figure, reference numeral 7 designates a lace 7.

A dam with a lip part is genorally used for the dam (for example, Unexamined Japanese Utility Model Publication No. Sho. 60-108512). As shown in FIG. 4, a lip 32 is extended from a base 31 bonded by an adhesive tape 5 or the like along the peripheral edge of the window glass 1. The lip 32 is pressed against the glass receiving surface 21.

In the conventional dam 3, when it is bent along a corner of the window glass 1, the bonding surface of the base 31, which is for the glass, is inclined as indicated by a dotted line shown in FIG. 5 so as to open with respect to the linear part particularly at the corner of which curvature radius is small. Adhesion is possibly peeled off. Further, the lip 32 closer to the inner side of the bent portion rises, so that when it is pressed against the glass receiving surface 21, its reaction force is large.

In the case of the dam of the type which has no lip and is square in cross section, it is difficult to bend it along the corner of the window glass. The bottom surface of the dam where it contacts the glass receiving surface is broad and flat. As a result, when it is pressed against the glass receiving surface, the pushing force applied to the glass receiving surface is dispersed. Therefore, the sealability is insufficient to contact the glass receiving surface. Particularly, in a case where the glass receiving surface includes a stepped part, there is a possibility to create a gap therebetween.

SUMMARY OF THE INVENTION

The present invention has an object to provide a fixing structure for a window glass of an adhesion type having such a dam that is smoothly bent along a corner of a window glass, with a less inclination thereof and a superior sealability to contact a glass receiving surface.

To achieve the object, the fixing structure for the window glass according to the present invention is provided with: an adhesive for bonding an outer periphery of the window glass to a glass receiving surface in the window opening edge of the vehicle body; and a dam mounted on an inner surface of the window glass along the adhesive for preventing the adhesive from projecting inwardly, in which the dam includes: a first recess formed at a first middle part of a side surface of the dam, to make the first middle part thinner than an upper surface of the dam; a second recess formed at a second middle part of a bottom surface of the dam where the dam contacts the glass receiving surface; and a pair of legs formed on both sides of the second recess.

A bending stress is absorbed by deformation of the recesses 41 on the both sides of the dam. Accordingly, the dam is smoothly bent along the corner of the window glass, with less inclination thereof. With provision of the legs 43 of the bottom surface, the pushing force concentrates on the legs 43, to thereby provide a good contact thereof with the glass receiving surface 21.

DETAILED DESCRIPTION OF THE PREFERRED EMBODIMENTS

Figure 1:
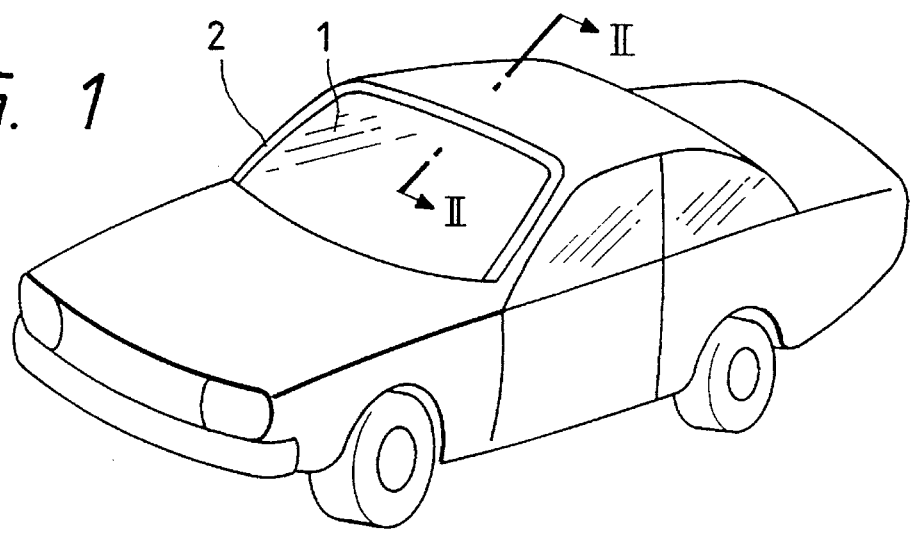
FIG. 1 is a perspective view showing an automobile to which the present invention is applied.
Figure 2:
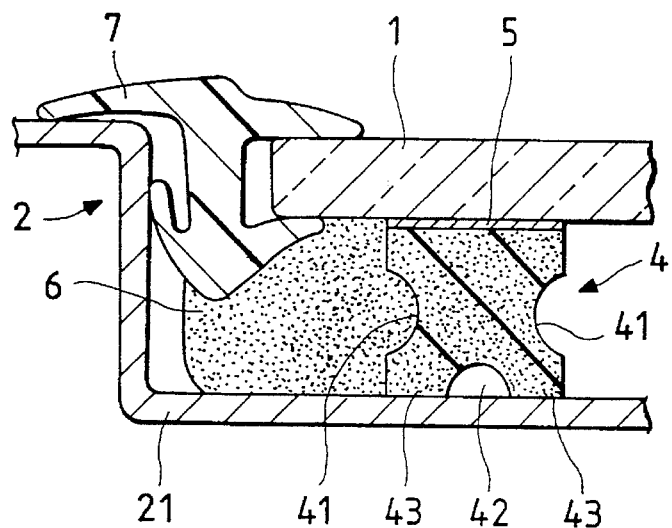
FIG. 2 is a cross sectional view of a fixing structure for a window glass according to an embodiment of the present invention, taken on a line II—II in FIG. 1.

In the preferred embodiment of the present invention shown in FIGS. 1 and 2, a molded dam 4 made of sponge rubber is bonded by an adhesive tape 5 along the peripheral edge of the inner side of a window glass 1 of the front window.

The dam 4 is substantially square in cross section. A recess 41 is formed at the middle of each of the side surfaces of the dam, whereby the middle part of the dam is thinner than the remaining portion thereof, for example, an upper surface of the dam. Another recess 42 is formed at the middle of the bottom surface of the dam, so that legs 43 are formed on both sides of the recess 42. The dam 4 is extended along the peripheral edge of the window glass 1, and is bent along the corners of the window glass 1, so that the dam 4 is bonded to the inner surface of the window glass.

The edge 2 of the window opening of a vehicle body is z-like shaped in cross section, and has a flange-like glass receiving surface 21. To fasten the window glass 1, adhesive 6 is put on the inner side of the dam 4, and the window glass 1 is pushed against the glass receiving surface 21 with the adhesive 6 and the dam 4 being inserted therebetween.

The dam 4 is bent about the center thereof as viewed in the width direction. When bent, the recess 41 on the outer side of the dam 4 is vertically expanded, while the recess 41 on the inner side thereof is vertically compressed, to thereby absorb a stress generated therein. As a result, since it can be bent along the corner of which the curvature radius is small, the dam 4 is not largely inclined. Because of the bending, the dam 4 is slightly inclined toward the window glass 1, but the dam 4 is not so inclined that the adhesive is peeled off.

When the dam 4 is pressed against the glass receiving surface 21, the pressure is concentrated on the legs 43. Therefore, the sealability is superior to contact the glass receiving surface 21.

Figure 3:
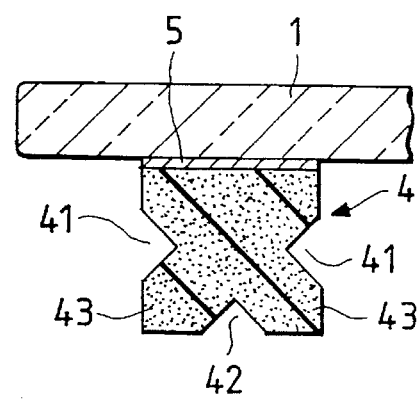
FIG. 3 is a cross sectional view of a fixing structure of the window glass according to another embodiment of the present invention.
Figure 4:
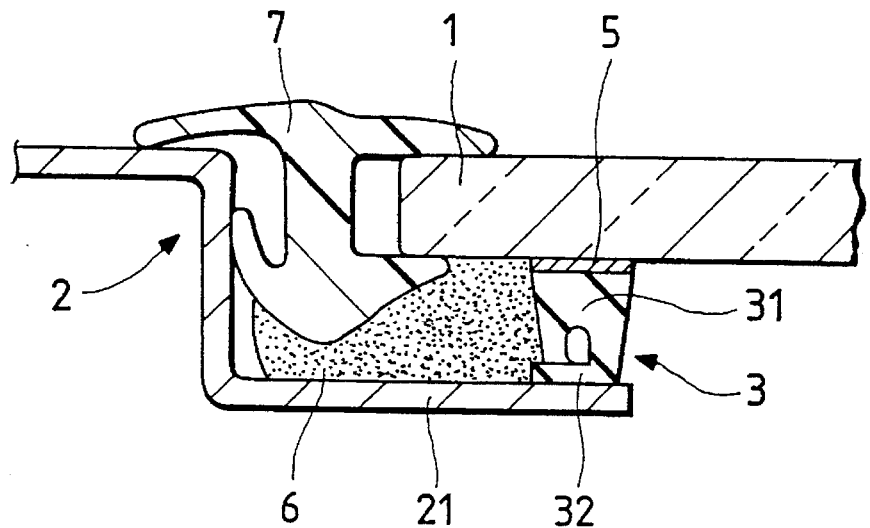
FIG. 4 is a cross sectional view of a conventional fixing structure of the window glass.
Figure 5:
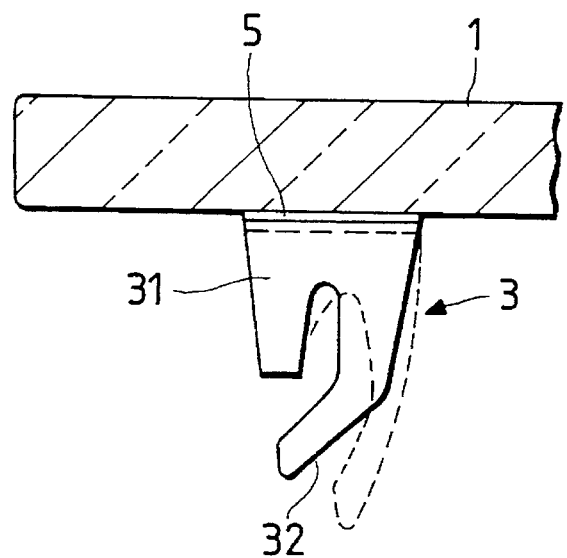
FIG. 5 is a diagram showing an unwanted deformation of the dam in the conventional fixing structure of the window glass.

The recesses 41 and 42 formed in the dam 4 are curved inward in cross section as shown in FIG. 2, but can be triangular as shown in FIG. 3. These recesses can be formed in any shape insofar as the dam is thinned at the middle of its height and has legs on the bottom thereof where the dam contacts the glass receiving surface 21. A lace member 7 is inserted between the window opening edge 2 and the end face of the window glass 1.

With the fixing structure for the window glass, the dam is smoothly bent along the corners of the window glass. When bent, the dam is inclined only an extremely small amount and deformation of the cross sectional configuration of the dam is likewise also small. Accordingly, the dam is not pulled away from adhesive tape 5, nor is tape 5 peeled off the window glass. The height of the fixing structure is substantially uniform along the entire peripheral edge of the window glass, which includes the corners thereof.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A structure for fixing a window glass to a window opening edge of a vehicle body, comprising:

adhesive material positioned to provide a bond between an outer periphery of the window glass and a glass receiving surface in said window opening edge of a vehicle body;

a dam mounted on said window glass about an inner surface thereof to control adhesive movement, said dam including:

a first recess formed at a first part of a side surface of said dam, to make said first part thinner than an upper surface of said dam;

a second recess formed at a second part of a bottom surface of said dam where said dam contacts said glass receiving surface; and a pair of legs formed on both sides of said second recess.

\* \* \* \* \*